INVENTOR.
EGON E. LOEBNER
BY Morris A. Rabkin
ATTORNEY

LOGIC NETWORK

Filed June 27, 1958 3 Sheets-Sheet 2

INVENTOR.

EGON E. LOEBNER

BY Morris L. Rabkin

ATTORNEY

INVENTOR.
EGON E. LOEBNER
BY Morris [signature]
ATTORNEY

United States Patent Office 3,050,633
Patented Aug. 21, 1962

3,050,633

LOGIC NETWORK

Egon E. Loebner, Princeton, N.J., assignor to Radio Corporation of America, a corporation of Delaware Filed June 27, 1958, Ser. No. 745,067
11 Claims. (Cl. 250—209)

This invention relates to data handling systems. More particularly, this invention relates to improved logic networks for use in data handling systems in which the information signals may be other than electrical.

Data handling systems in modern commerce require the use of numerous networks for performing logical operations. These networks are commonly referred to as logic networks; each such network is usually capable of performing only a single logical operation. It is desirable to reduce the number of logic networks required in a given system by providing networks which may be converted from one logic to another by a simple operation.

An information handling system in which the information signals are other than electrical is described in the article "Opto-Electronic Devices and Networks," by E. E. Loebner in the Proceedings of the IRE, December 1955, at page 1897. As described in that article, logic networks, which may be termed opto-electronic networks, may be formed from combinations of electroluminescent and photoconductive cells. The phenomenon known as electroluminescence is one occurring in certain phosphor materials that may be caused to emit visible, or near-visible, radiations by subjecting them to electrical fields, for example, to alternating electrical fields of a certain magnitude and frequency. A photoconductor is a conductive material which has the property of changing its electrical impedance in response to incident radiations.

It is among the objects of this invention to provide:

A new and improved logic network in which the information signals are other than electrical;

A new and improved network that may be converted from performing one logic to another by a simple operation;

A new and improved opto-electronic logic network employing electroluminescent and photoconductive cells; and A new and improved opto-electronic logic network capable of performing several logical operations in accordance with the bias applied to said network.

In accordance with this invention a plurality of first transducers that are responsive to signals of an energy form other than electrical are used to control power of an electrical form. The control is effected by providing a change in impedance of a transducer in response to the non-electrical signals. A second type of transducer is connected in circuit with the first transducers for converting the controlled electrical power to the aforementioned non-electrical form of power. The transducers are arranged to provide a logic network. Another plurality of transducers of the first type are inserted into the network with the other transducers for switching the logic of the network. In the preferred embodiment, a separate source of non-electrical signals is provided for the logic switching transducers. Each of the latter plurality may have a different threshold sensitivity to these non-electrical signals. The network may be biased by varying the intensity of the non-electrical signals incident on the logic switching transducers. The logic of the network may be changed each time the bias is altered an amount sufficient to change the pattern of activation of the switching transducers.

There are sixteen possible logical operations that may be performed by a circuit having two inputs and one output. The logic of the circuit may be represented schematically by the symbol X, which has four quadrants. If the two inputs are designated A and B, each of the quadrants may represent a different one of the following propositions:

(1) A input alone
(2) B input alone
(3) A and B inputs simultaneously
(4) Neither input The truism of the proposition may be indicated by placing a dot, or other character, in the proper quadrant. If the quadrants are labeled as follows:

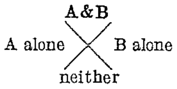

then the symbol ·X indicates that the logic network will yield an output only when the A input alone is present. As stated hereinabove, there are sixteen possible logical operations that may be performed with the network having two inputs and one output, wherein the output either exists or does not exist. The following four propositions and their meanings should enable one skilled in the art to construct an "alphabet" embodying all of the sixteen possibilities.

| Proposition: | Output present |
|---|---|
| X | Never. |
| Ẋ | With A and B inputs. |
| ·Ẋ | With A and B inputs, or with A input alone. |
| ·Ẋ· | With A and B inputs, with A input alone, or with B input alone. |

The second symbol above will be recognized as expressing the logic of an "and" gate. An "and" gate is well-known in the art as a circuit having two inputs and one output, and having an output only when both of the inputs are present.

The foregoing and other objects, the advantages and novel features of this invention as well as the invention itself, both as to its organization and mode of operation may be best understood from the following description when read in connection with the accompanying drawing in which like reference numerals refer to like parts and which;

Figure 1:
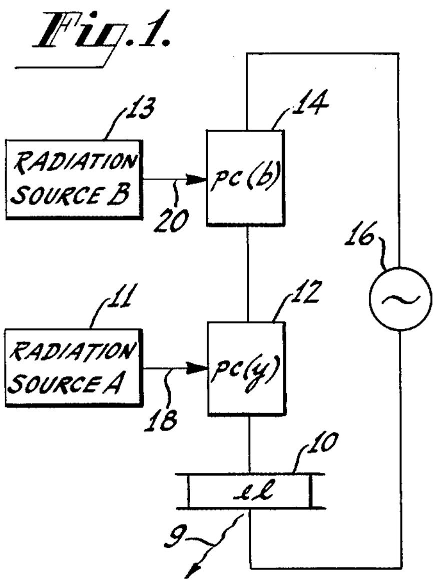
FIGURES 1 and 2 are schematic diagrams of two opto-electronic logic networks useful as an aid in understanding the present invention.

FIGURE 1 illustrates a logic network having an element 10 for generating visible, or near-visible, radiation 9. The element 10 may be, for example, an electroluminescent (el) cell which may be made of a material such as zinc sulphide phosphor. The circuit also includes two elements 12, 14 that are responsive to radiations of the type described above. One of the elements 12 may be responsive to incident rays 18 of a particular color of light, for example, yellow, from a radiation source 11. The other element 14 may be responsive to rays 20 of a different light color, such as blue, from another radiation source 13. Alternatively, each of the elements 12, 14 may be responsive to the same color of spectral light, and the light may be derived from separate sources 11, 13 over separate photoducts 18, 20, respectively. A photoduct may be defined as a light path. These radiation responsive elements may be, for example, photoconductive cells (pc), also called photoconductors, which may be made of a material such as a cadmium sulphide crystal. The radiation sources 11, 13, may be electroluminescent cells of other logic networks, and said cells may have yellow and blue output radiations, respectively.

The electroluminescent cell 10 and the photoconductors 12, 14 are electrically connected in a series combination. A source 16 of electrical potential is connected across the combination. The source may be alternating or direct, depending upon the characteristics of the electroluminescent cell. For purposes of illustration, let us assume that one photoconductor 12 is responsive only to yellow light while the other photoconductor 14 is responsive only to blue light. The photoconductors 12, 14 have been labeled pc(*y*) and pc(*b*), respectively, to indicate these responsivities. In addition, let us designate the yellow light as input A and the blue light as input B. Consider now the operation of the logic network. In the absence of incident light of the proper color, the impedance of a photoconductor is of sufficient magnitude to limit the voltage appearing across the electroluminescent cell 10 to a value less than the threshold of that element. Although there will usually be some output from the electroluminescent cell 10, the output may be considered non-existent for present purposes when the voltage across the cell 10 is less than the threshold value. The characteristics of the photoconductors 12, 14 are such that an output will be derived from the electroluminescent cell 10 only when both photoconductors receive incident light inputs of the proper spectral color. The network thus functions as an "and" gate, and the logic may be represented by the symbol Ẋ.

Figure 2:
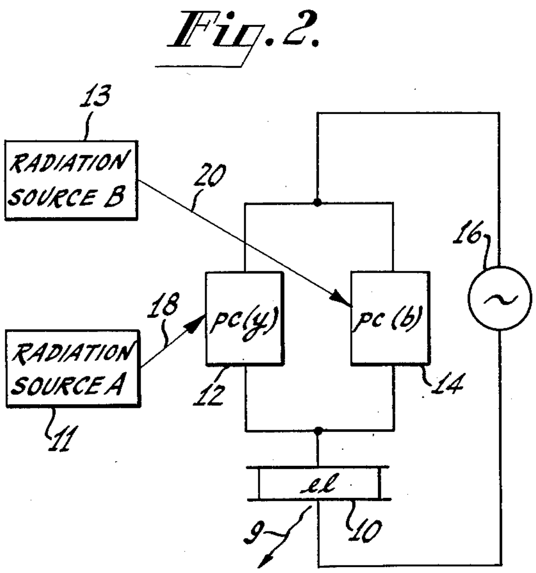

The components of the circuit of FIGURE 1 may be rearranged in various combinations to form other networks with different logic. One such other network is illustrated in FIGURE 2, wherein the photoconductors 12, 14 are connected in parallel with each other. The parallel combination is connected in series with the electroluminescent cell 10 and the source 16. In the absence of both inputs, the impedances of the photoconductors are of sufficient magnitude to prevent an output from the electroluminescent cell 10. When rays 18 of yellow light are incident on the proper photoconductor 12, the impedance of that element is decreased, and the resulting voltage across the electroluminescent cell 10 is sufficient to sustain an output therefrom. In like manner, an output will exist when rays 20 of blue light are incident on the other photoconductor 14. An output will also be obtained when each of the photoconductors receives incident light of the proper color. The network here presented may be defined as a non-exclusive "or" gate and the logic may be represented by the symbol ·Ẋ·. That is to say, an output will be obtained from the network when any one of the following conditions is satisfied:

(1) A input alone;
(2) B input alone; or
(3) both A and B inputs.

Figure 3:
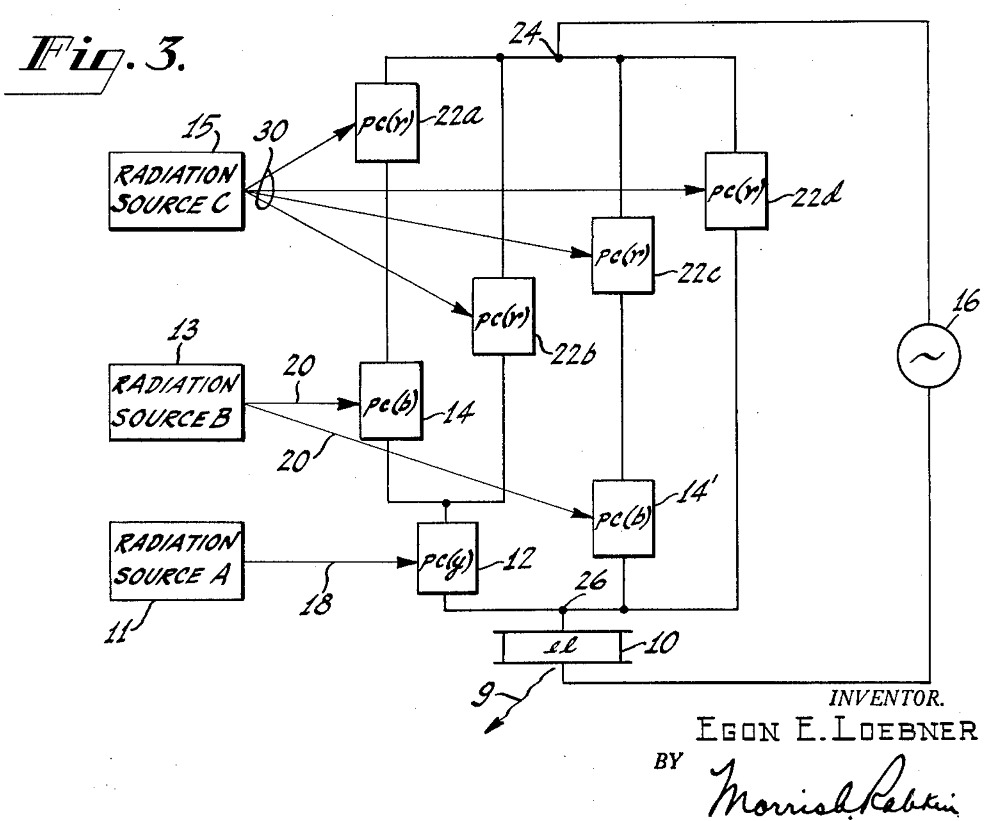
FIGURE 3 is a schematic diagram of a logically flexible network according to the present invention.

As stated hereinabove, it is desirable to provide a single network which can perform several logical operations. FIGURE 3 illustrates a flexible logic network that can be converted from one logic to another by a relatively simple operation. The circuit can exist in five states of logic, the logic of the five states being represented by the symbols X, Ẋ, ·Ẋ, ·Ẋ·, ·Ẋ·. The circuit may include elements similar to those employed in the circuits heretofore described. Also included are photoconductors 22*a* through 22*d* which may be responsive to incident light rays of another, different color, which may be, for example, red. The rays of red light emanate from a separate radiation source 15, which may be, for example, an incandescent bulb with a suitable filter. Each of the latter photoconductors 22*a* through 22*d* may have a different threshold sensitivity to incident red light. The characters *a, b, c,* and *d* represent a monatomic series of the threshold sensitivities of these elements, "*a*" being the most sensitive and responsive to all intensity levels of red light of orders "*a*" and higher, and "*d*" being the least sensitive and responsive only to intensities of red light of orders "*d*" and higher. The network of FIGURE 3 may be converted from one logic state to another by varying the "bias," that is to say, by changing the intensity of the red light.

In the illustrated embodiment of the flexible logic circuit, a first blue light-sensitive photoconductor 14 is connected in series with a photoconductor 22*a* which is responsive to incident rays 30 of the red light of "*a*" intensity. This combination is connected in parallel with a photoconductor 22*b* which has a threshold sensitivity "*b*" to red light. A photoconductor 12 which is responsive to rays 18 of yellow light is connected in series with the parallel combination. The entire combination is connected between a pair of end terminals 24, 26. Two other branches are connected between these terminals. The first branch comprises a second blue light-sensitive photoconductor 14' connected in series with a photoconductor 22*c* which is responsive to rays 30 of red light of "*c*" intensity. The second branch comprises a photoconductor 22*d* which is responsive to rays of red light of "*d*" intensity. An electroluminescent cell 10 and a source 16 of electrical potential are serially connected across the end terminals 24, 26 of the entire array of photoconductors.

In order to more fully appreciate the flexibility of the above-described network, consider the operation of the network for each of the following five intensities of red light bias;

(1) Less than "*a*";
(2) Equal to or greater than "*a*," but less than "*b*";
(3) Equal to or greater than "*b*," but less than "*c*";
(4) Equal to or greater than "*c*," but less than "*d*"; and
(5) Equal to or greater than "*d*."

In the first condition, each of the five-bias-sensitive photoconductors 22*a* through 22*d* presents a high impedance to the flow of current from the source 16, and only a relatively small portion of the voltage of the source 16 is applied across the electroluminescent cell 10. Under these circumstances, the voltage across the el cell 10 is insufficient for the cell to generate a significant radiation output irrespective of any yellow or blue, (A, B) inputs to the other photoconductors 12, 14, 14'. The logic of the network may be represented by the symbol X, that is to say, never an output.

When red light of "*a*" intensity is incident upon the bias-sensitive photoconductors 22*a* through 22*d*, only that photoconductor 22*a* which has the "*a*" threshold sensitivity presents a sufficiently low impedance to the flow of current. Both the yellow light-sensitive photoconductor 12 and the blue light-sensitive photoconductor 14 must receive incident light (A and B inputs) before the voltage across the el cell 10 will be sufficient for the cell to generate a radiation of significant intensity. Thus, when only one of the inputs A or B is present, there will be no output from the cell 10. The logic of the circuit with "*a*" bias may be represented by the logic symbol Ẋ.

The impedances of two bias-sensitive photoconductors 22*a*, 22*b* are sufficiently lowered in response to a bias of "*b*" intensity. One of these elements 22*b* effectively shunts one of the blue light-sensitive photoconductors 14. Under these conditions, the el cell 10 provides an output whenever yellow light is incident on the yellow light-sensitive photoconductor 12. The logic of the circuit operating with "*b*" bias may be represented thusly: $\cdot\dot{X}$.

When red light of "*c*" intensity is incident upon the bias-sensitive photoconductors 22*a*–22*d*, an output will be provided by the electroluminescent cell in response to either a yellow light input or a blue light input, or both. This logic is represented by the symbol $\cdot\dot{X}\cdot$.

A red light bias of intensity "*d*" provides the network with a fifth state of logical operation. All of the bias-sensitive photoconductors 22*a*–22*d* are responsive to a bias of this intensity. As may be seen in FIGURE 3, one of these photoconductors 22*d* is in parallel with all of the others and provides a low impedance path between the electroluminescent cell 10 and the source 16, that is to say, between the end terminals 24, 26 of the array of photoconductors. The electroluminescent cell 10 always has an output under these conditions. The logic of the network with "*d*" bias may be represented by the symbol $\cdot\underset{\cdot}{\dot{X}}\cdot$.

Figures 4, 5:
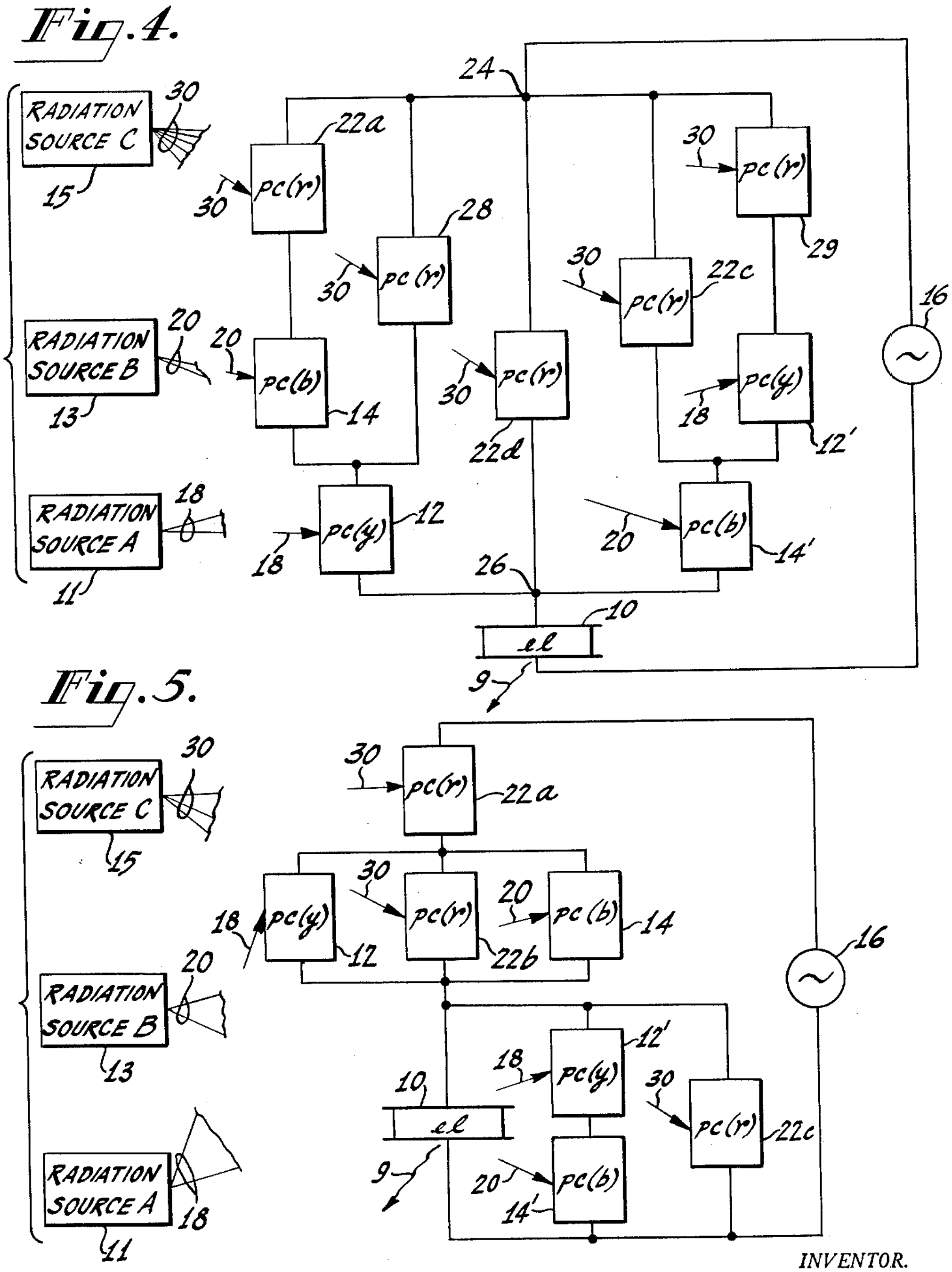
FIGURE 4 is a modification of the network of FIGURE 3.
FIGURE 5 is a schematic diagram of another logically flexible network.

The network of FIGURE 4 is a modification of the network of FIGURE 3. In order to avoid confusing lines in the diagram, the light rays 18, 20, 30 from the radiation sources 11, 13, 15, respectively, have been broken away. The "*b*" bias-sensitive photoconductor 22*b* has been replaced by another photoconductor 28. This latter photoconductor 28 may, for example, have either a threshold sensitivity "*b*" to red light, or it may be in effect an insulator, that is to say, it may present a very high impedance irrespective of the intensity of red light incident thereon. In addition, the series combination of a yellow light-sensitive photoconductor 12′ and another photoconductor 29 is connected in parallel with the "*c*" bias sensitive photoconductor 22*c*. This additional photoconductor 29 may also, for example, be either an insulator or it may have a "*b*" threshold sensitivity to red light. If the first-mentioned additional photoconductor 28 has a "*b*" threshold sensitivity while the other additional photoconductor 29 is insensitive to red light, then the operation of the network is identical to that of the network of FIGURE 3, and the five states of logic may be represented thusly: $X$, $\dot{X}$, $\cdot\dot{X}$, $\cdot\dot{X}\cdot$, $\cdot\underset{\cdot}{\dot{X}}\cdot$. If, however, the sensitivities of these two photoconductors 28, 29 are reversed, the network will have the five possible states of operation represented by the symbols $X$, $\dot{X}$, $\dot{X}\cdot$, $\cdot\dot{X}\cdot$, $\cdot\dot{X}\cdot$. Accordingly, it may be seen that the network of FIGURE 4 may perform five different logical operations depending upon the bias. In addition, the five logical operations may be varied by rearranging the bias-sensitive photoconductors. This type of network may be defined as a "universal" logic network.

FIGURE 5 illustrates another flexible logic network. The components in this network are similar to those heretofore described. It is believed unnecessary to describe the operation of this network in view of the descriptions previously given. If the bias sensitive photoconductors 22*a*, 22*b*, 22*c* have threshold sensitivities *a*, *b*, *c*, respectively, the logic of the network may be represented by the following symbols in response to light bias levels less than *a*, *a*, *b*, and *c*:

$$X,\ \cdot X\cdot,\ \cdot X\cdot,\ X.$$

Figures 6, 7:
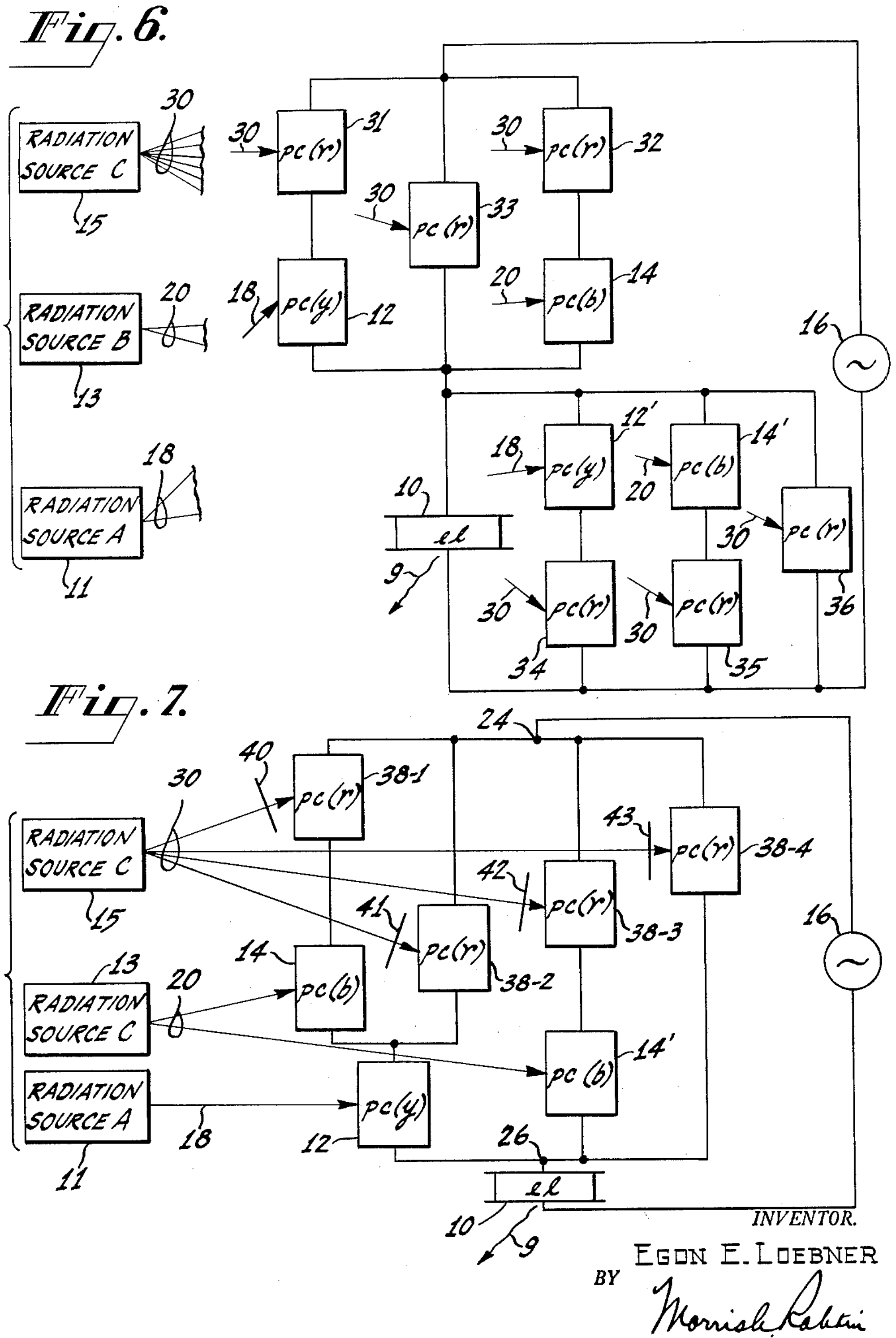
FIGURE 6 is a schematic diagram of still another logically flexible network according to the present invention.
FIGURE 7 is a schematic diagram of another embodiment of the invention.

FIGURE 6 illustrates another universal logic network which may be converted from one logic state to another by varying the bias. In addition, the various logic states may be changed by interchanging the bias-sensitive photoconductors 31 through 36. Various ones of these bias-sensitive photoconductors 31 through 36 may have different threshold sensitivities to incident red light; others, depending upon the logic states desired, may be insensitive to the levels of available bias and will, therefore, function as insulators for all practical purposes. If the bias-sensitive photoconductors 31 through 34 have threshold sensitivities *a*, *c*, *b*, and *d*, respectively, while the remaining bias-sensitive photoconductors 35 and 36 are made insensitive to incident red light, then the network will have the following logic states when subjected to biases of 0, *a*, *b*, *c*, and *d*, respectively:

$$X,\ \cdot\dot{X},\ \cdot\dot{X}\cdot,\ \cdot\underset{\cdot}{\dot{X}}\cdot,\ \underset{\cdot}{X}\cdot$$

In like manner, if the photoconductors 31, 32, 33, and 35 have threshold sensitivities *b*, *a*, *c*, and *d*, respectively, while the remaining bias-sensitive elements 34, 36 are "insulators," the network will have the five following logic states when operating with biases of 0, *a*, *b*, *c*, and *d*, respectively;

$$X,\ \dot{X}\cdot,\ \cdot\dot{X}\cdot,\ \cdot\underset{\cdot}{\dot{X}}\cdot,\ \cdot\underset{\cdot}{X}$$

These bias-sensitive photoconductors may be arranged in other patterns to provide flexible logic networks capable of performing other logical operations.

FIGURE 7 illustrates another embodiment of the present invention. The configuration of photoconductors is the same as that of FIGURE 3. However, each of red light-sensitive elements 38–1 through 38–4 has the same threshold sensitivity to incident red light. Filters 40–43 are positioned between the source 15 of red light and these photoconductors 38–1 through 38–4 respectively. These filters, which may be, for example, neutral density filters, provide means for biasing the network. Each of the filters may diminish the intensity of red light a different amount so that each of the photoconductors 38–1 through 38–4 receives a different intensity of incident light. If the incident light intensities range from a maximum at photoconductor 38–1 to a minimum at photoconductor 38–4, this network will have the same logic as the network of FIGURE 3, namely:

$$X,\ \dot{X},\ \cdot\dot{X},\ \cdot\dot{X}\cdot,\ \cdot\underset{\cdot}{\dot{X}}\cdot$$

The network may have different logic states depending upon the arrangement of the filters 40–43. This same method of biasing may be used in the other networks heretofore described.

The flexible logic circuits described hereinabove include three classes of photoconductors, wherein the photoconductors of each different class are responsive to different colors of light from separate sources. This arrangement is preferred because it obviates the need for photoducts and components associated therewith. If desired, the invention may be practiced using photoconductors of a single class wherein all of the photoconductors respond to the same color of incident light. In this case, the rays of light may be directed to the photoconductors over photoducts 18, 20, 30 from the separate light sources 11, 13, 15, respectively.

There has been shown and described a novel type of circuit which may be converted from one logic to another by a simple operation. Various such circuits may be combined to provide a new and improved information handling system in which the information signals are in a form of energy other than electrical.

What is claimed is:

1. The combination comprising: a radiation generating device, a plurality of radiation responsive elements electrically connected in a network with said radiation generating device, means for electrically energizing said network, and a common source of radiation for irradiating said elements, one of said elements having a certain threshold sensitivity to said radiation from said common source, others of said elements having different threshold sensitivities to said radiation from said source.

2. In combination, an electroluminescent cell, a plurality of photoconductive elements electrically connected in circuit with said electroluminescent cell, means for energizing said circuit, a common source of light radiation of adjustable intensity, and means for applying said light radiation to said elements, one of said elements having a certain amplitude threshold sensitivity to said light radiation, others of said elements having different amplitude threshold sensitivities to said light radiation.

3. The combination comprising: a logic network including an output device, a plurality of signal receiving means, a plurality of energizing circuits connected to said output device and each including at least one of said signal receiving means, means for applying signals selectively to said signal receiving means, a plurality of radiation-responsive control elements electrically connected with various ones of said energizing circuits for controlling the impedance characteristics thereof, various ones of said elements having different amplitude threshold sensitivities to received radiation, and means for applying radiation to all of said elements from a common control source.

4. A flexible logic network comprising: an output device having two terminals; a plurality of different energizing paths connected between one of said terminals and a common point; means for applying an energizing signal between said point and the other of said terminals; variable impedance, signal-controlled means connected in various ones of said paths; means for applying information signals selectively to said controlled means; a plurality of control elements including radiation-sensitive, variable impedance devices connected in various ones of said paths and each having a different threshold sensitivity to received radiation; and means for applying a selected amount of radiation to all of said elements from a common control source.

5. The combination comprising: an electroluminescent cell, a plurality of light responsive elements providing variable impedances to incident light, said cell and said elements being electrically connected, first, second, and third sources of light radiation, said plurality including an element responsive to light radiation from said first source, another element responsive to light radiation from said second source, and other elements responsive to light radiation from said third source, different ones of said others having different threshold sensitivities to said light radiation from said third source.

6. A flexible logic network comprising: a radiation generating means, a plurality of photoconductive cells responsive to light radiation, said cells and said generating means being electrically connected, a first light input signal, one of said cells being responsive to said first input signal, a second light input signal; another of said cells being responsive to said second input signal, and a source of light of variable intensity, others of said cells being responsive to light from said source, different ones of said others of said cells having different amplitude threshold sensitivities to radiation from said source, said generating means providing the output of said network.

7. A flexible logic circuit comprising: a plurality of photoconductors and an electroluminescent cell electrically connected in combination, means for electrically energizing said combination, a first light input applied to one of said cells, a second light input applied to another of said cells, a source of light of variable intensity applied to others of said cells, different ones of said others of said cells having different amplitude threshold sensitivities to light from said source, and means for varying the intensity of light from said source to exceed selected ones of said amplitude threshold sensitivities.

8. The combination comprising: a logic network having a plurality of signal responsive input circuits connected to a common junction and each tending to change the voltage at said junction in response to received input signals; and means for selectively determining the logic of said network, said means including a plurality of variable impedance, radiation-responsive elements connected in various ones of said input circuits, one of said elements having a first amplitude threshold, others of said elements having different amplitude thresholds and means for applying radiation of variable intensity from a common control source to each of said elements.

9. The combination comprising: a logic network having a plurality of signal responsive input circuits connected to a common junction and each tending to change the voltage at said junction in response to received input signals; and means for selectively changing the logic of said network, said means including a plurality of photoconductive cells connected in various ones of said input circuits, one of said cells having a certain amplitude threshold value, others of said cells having other, different amplitude threshold values, and means for applying radiation of variable intensity from a common control source to each of said elements.

10. The combination comprising: a logic network having a plurality of signal responsive input circuits connected to a common junction in said network, each of said circuits tending to change the voltage at said junction in response to a received input signal; and means for selectively determining the logical operation performed by said network, said means including a plurality of radiation-responsive control devices connected in various ones of said circuits and each having a radiation amplitude threshold, various ones of said devices having different amplitude thresholds, and means for applying radiation of selected intensity from a common control source to each of said devices.

11. The combination comprising: a logic network having a plurality of signal responsive input circuits, including signal responsive devices, connected to a common junction and each tending to change the voltage at said junction in response to received input signals; means for applying input signals selectively to said signal responsive devices; and means for determining the logical operation performed by said network including a plurality of radiation-responsive, variable impedance control devices connected in various ones of said circuits, and means for applying to different ones of said devices different intensities of radiation from a common control source.

References Cited in the file of this patent

UNITED STATES PATENTS

| | | |
|---|---|---|
| 2,727,683 | Allen et al. | Dec. 20, 1955 |
| 2,776,380 | Andrews | Jan. 1, 1957 |
| 2,790,088 | Shive | Apr. 23, 1957 |
| 2,797,256 | Millspaugh | June 25, 1957 |
| 2,885,564 | Marshall | May 5, 1959 |
| 2,900,522 | Reis | Aug. 18, 1959 |
| 2,942,120 | Kazan | June 1, 1960 |

OTHER REFERENCES

Mellon Institute of Industrial Research, Quarterly Report No. 3, second series of the Computer Components Fellowship No. 347, April 1, 1954 to June 30, 1954 (effective publication date is Aug. 2, 1954 as given by the Armed Services Technical Agency).

Marshall et al.; Proceedings of the Ass'n of Computing Machinery, pages 2 and 3, May 1952, pages 159–163.

Loebner: Proceedings of the IRE, vol. 43, No. 12, December 1955, pp. 1897–1906 (copy in Div. 37).

UNITED STATES PATENT OFFICE
CERTIFICATE OF CORRECTION

Patent No. 3,050,633 August 21, 1962

Egon E. Loebner

It is hereby certified that error appears in the above numbered patent requiring correction and that the said Letters Patent should read as corrected below.

Column 5, line 62, the symbols should appear as shown below instead of as in the patent:

$X$, $\cdot X \cdot$, $\cdot \underset{\bullet}{X} \cdot$, $X$.

Signed and sealed this 15th day of January 1963.

(SEAL)
Attest:

ERNEST W. SWIDER
Attesting Officer

DAVID L. LADD
Commissioner of Patents